United States Patent [19]

Gysi

[11] Patent Number: 4,799,585
[45] Date of Patent: Jan. 24, 1989

[54] CONVEYOR DEVICE FOR WORKPIECES

[75] Inventor: Peter Gysi, Bellikon, Switzerland

[73] Assignee: ELPATRONIC AG, Switzerland

[21] Appl. No.: 57,330

[22] Filed: Jun. 2, 1987

[51] Int. Cl.$^4$ .............................................. B65G 25/00
[52] U.S. Cl. ...................................... 198/743; 74/89.2; 74/501.5 R
[58] Field of Search .................. 198/743, 746, 468.01, 198/468.1, 468.11, 719, 747; 254/DIG. 6; 74/89.2, 108, 501.5 R, 501 R

[56] References Cited

U.S. PATENT DOCUMENTS

| 2,552,743 | 5/1951 | Simpson | 198/743 |
| 4,059,021 | 11/1977 | Spanel et al. | 74/89.2 |
| 4,229,134 | 10/1980 | Reist | 414/46 |
| 4,354,594 | 10/1982 | Galloway | 198/743 |

FOREIGN PATENT DOCUMENTS 3118133 3/1982 Fed. Rep. of Germany .

Primary Examiner—Robert J. Spar
Assistant Examiner—Cheryl L. Gastineau
Attorney, Agent, or Firm—McCormick, Paulding & Huber

[57] ABSTRACT

A catch carrier (28, 28'), on which a pair of conveying catches (30) is pivotally mounted, can be reciprocated along a guide (32). Catch carrier (28, 28') and conveying catches (30) are each connected, by a flexibly resilient band (42; 62), to a sheave (44; 64) which can be rotated backwards and forwards. The two sheaves (44, 64) are so arranged and their rotary movements are so phase-displaced in relation to one another that the bands (42, 62) push the catch carrier (28, 28') and the conveying catches (30) for each working stroke, then pivot the conveying catches (30) into an inoperative position and pull them back together with the catch carrier (28, 28'). In regions in which at least one of the bands (42, 62) is wrapped round them, the two sheaves (44, 64) are surrounded by guide members which prevent the bands from yielding under normal loading. Some of the guide members (82) can be moved away from the associated sheave (44) against the resistance of a spring arrangement (92) so that the bands (42, 62) can yield resiliently if they are overloaded during a working stroke. The two sheaves (44, 64) are connected by clamp couplings to their driving, stationary shafts and can be adjusted for different heights of can-body blanks by infinitely variable turning in relation to their shafts.

10 Claims, 7 Drawing Sheets

CONVEYOR DEVICE FOR WORKPIECES

The invention relates to a conveyor device for workpieces having
 a catch carrier which is reciprocable along a guide,
 at least one conveying catch which is pivotally mounted on the catch carrier, and
 a transmission which connects the catch carrier to a rotary drive.

In a known conveyer device of this type (DE-OS 31 18 133), the conveying catch is pivotally mounted on a sliding carriage which is reciprocable along a slide rail by means of a connecting rod. The connecting rod is connected to a rotary drive through a crank mechanism; with different lengths of can-body blanks, this device has to be displaced accordingly.

Such known conveyor devices prove satisfactory on machines for welding together the longitudinal edges of rounded can-body blanks, so long as the number of blanks to be welded per unit of time does not exceed a certain rate, for example of 300 blanks per minute. At higher conveying frequencies, however, the known conveyor device is susceptible to trouble.

It is therefore the object of the invention to develop further a conveyor device for workpieces in such a manner that it is reliable in operation even at high conveying frequencies and with different conveying strokes.

According to the invention, this problem is solved in a conveyor device of the type described at the beginning in that the transmission comprises at least one sheave which can be rotated backwards and forwards and at least one flexibly resilient band which is secured by one of its ends to the sheave, is wrapped partially round this and is secured by its other end to the catch carrier or to the conveying catch.

Above all, the conveyor device according to the invention has the advantage that the inertia of the masses which are reciprocable substantially rectilinearly, together with the catch carrier and the conveyor catch, are small and therefore render high conveying frequencies possible. In addition, the or each flexibly resilient band protects the device from damage because it can yield resiliently if it is overloaded by excessive pushing forces.

In particularly simple forms of embodiment of the conveyor device according to the invention, only a single sheave, which can be rotated backwards and forwards, together with an associated flexibly resilient band need be provided. If this single band is secured to the catch carrier, the catch can be formed in such a manner that, before the beginning of each working stroke of the catch carrier, it pivots into a working position as a result of its own force of gravity and at the beginning of the following return stroke of the catch carrier, is pivoted into an inoperative position by a following workpiece. On the other hand, when only one sheave which can be rotated backwards and forwards is used, it is also possible for the associated flexibly resilient band to be secured to the conveying catch and to impart its reciprocating movement to the catch carrier through this; in this case, the necessary pivoting of the conveying catch in relation to the catch carrier can be caused each time by its mass movement of inertia and/or friction on the associated guide.

Nevertheless, a further development of the invention is particularly advantageous wherein
 secured to a first sheave which can be rotated backwards and forwards is one end of a first flexibly resilient band, the other end of which is secured to the catch carrier,
 secured to a second sheave which can be rotated backwards and forwards is one end of a second flexibly resilient band, the other end of which is secured to the conveying catch, and
 the two sheaves can be drive phase-displaced in relation to one another.

Simple possibilities of adjustment for different lengths of can-body blanks, that is to say for the position of the section over which the catch carrier is reciprocated, and for the position of the pivotal range of the conveying catch, can result, according to the invention, from the fact that each of the sheaves is connected to a shaft driving it by means of a coupling which renders possible a continuously variable rotary adjustment of the sheave in relation to the shaft.

A space-saving arrangement of the sheaves is rendered possible by the fact that both bands are wrapped round one of the two sheaves over a portion of its circumference. In this case, it is particularly advantageous if one of the two bands is wrapped round the two sheaves in opposite directions.

The invention is preferably further developed in that
 at least part of the circumference of at least one sheave is surrounded by guide members which guide the associated band round the sheave in question, and
 at least one of the guide members can be moved away automatically from the associated sheave in the event of overload.

In this manner, on the one hand the possibility is afforded of transmitting considerable thrusts via the flexibly resilient bands but on the other hand the bands retain the advantage that, in the event of overload, they can form a loop bending away from the sheave without being damaged as a result.

The form of embodiment of the invention described above can be developed in such a manner that two guide members or groups of guide members are each mounted on a jaw and these jaws can be pivoted away from one another and from the associated sheave in the event of overload. In this case, the two jaws may appropriately be supported by a common, bistable spring arrangement. Furthermore, it is useful if, associated with at least one guide member which can be moved away in the event of overload, there is a sensor which switches off the rotary drive in the event of overload.

The conveyor device according to the invention is particularly suitable for a machine for welding together the longitudinal edges of rounded can-body blanks, which comprises a slide rail on which the longitudinal edges are guided. For this application, the invention can be further developed in that
 disposed along at least one portion of the slide rail is a band guide and
 the catch carrier is mounted astride the band guide and carries a conveying catch at each side thereof.

One example of embodiment of the invention is explained below, with further details, with reference to diamgrammatic drawings.

Figure 7:
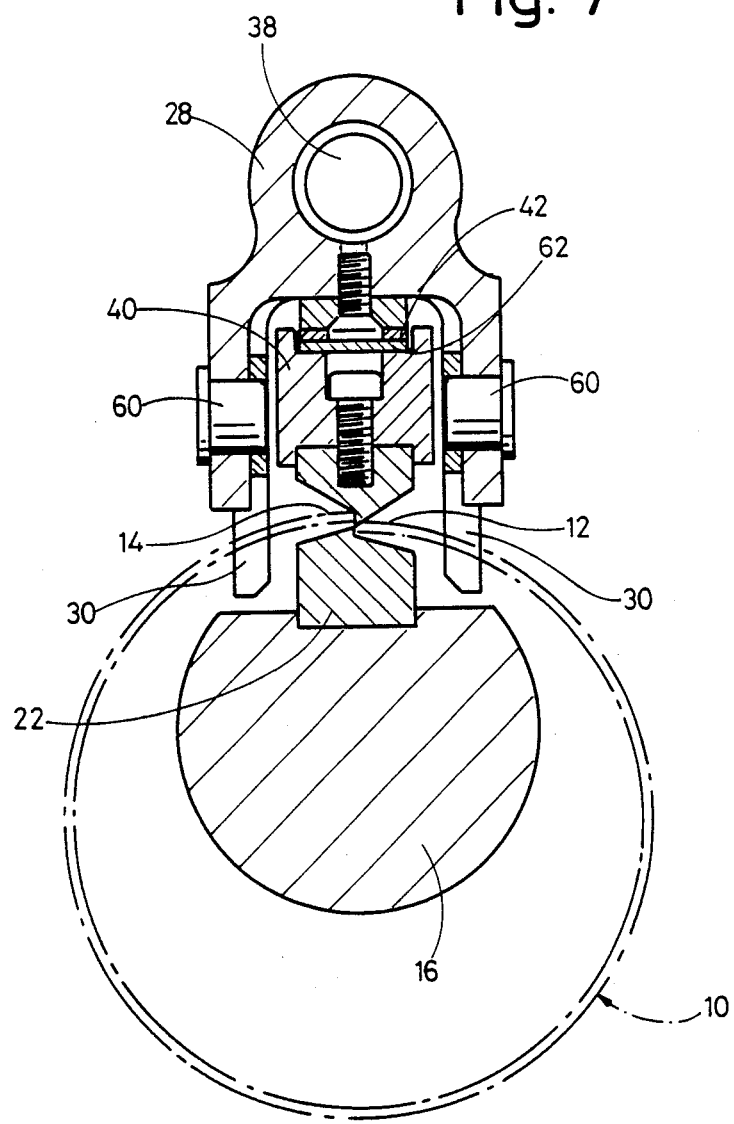
FIG. 7 shows the partial section VII—VII in FIG. 3.

The conveyor device according to the invention is installed in a machine which is only partially illustrated and with which can-body blanks 10 of sheet metal are welded together at their longitudinal edges 12 and 14 (FIG. 7). The machine has a stationary horizontal arm 16 round which the can-body blanks 10 are rounded in known manner by a device not illustrated to be subsequently introduced into a slide rail 22 along the arm 16 by pusher dogs 18 of a conveyor chain 20. The slide rail 22 is secured to the arm 16, extends in the longitudinal direction thereof and has a Z-shaped section in which the two longitudinal edges 12 and 14 of each can-body blank 10 are guided in such a manner that they are ultimately moved through, overlapping one another, between two electrode rollers 24 and 26.

Figure 1:
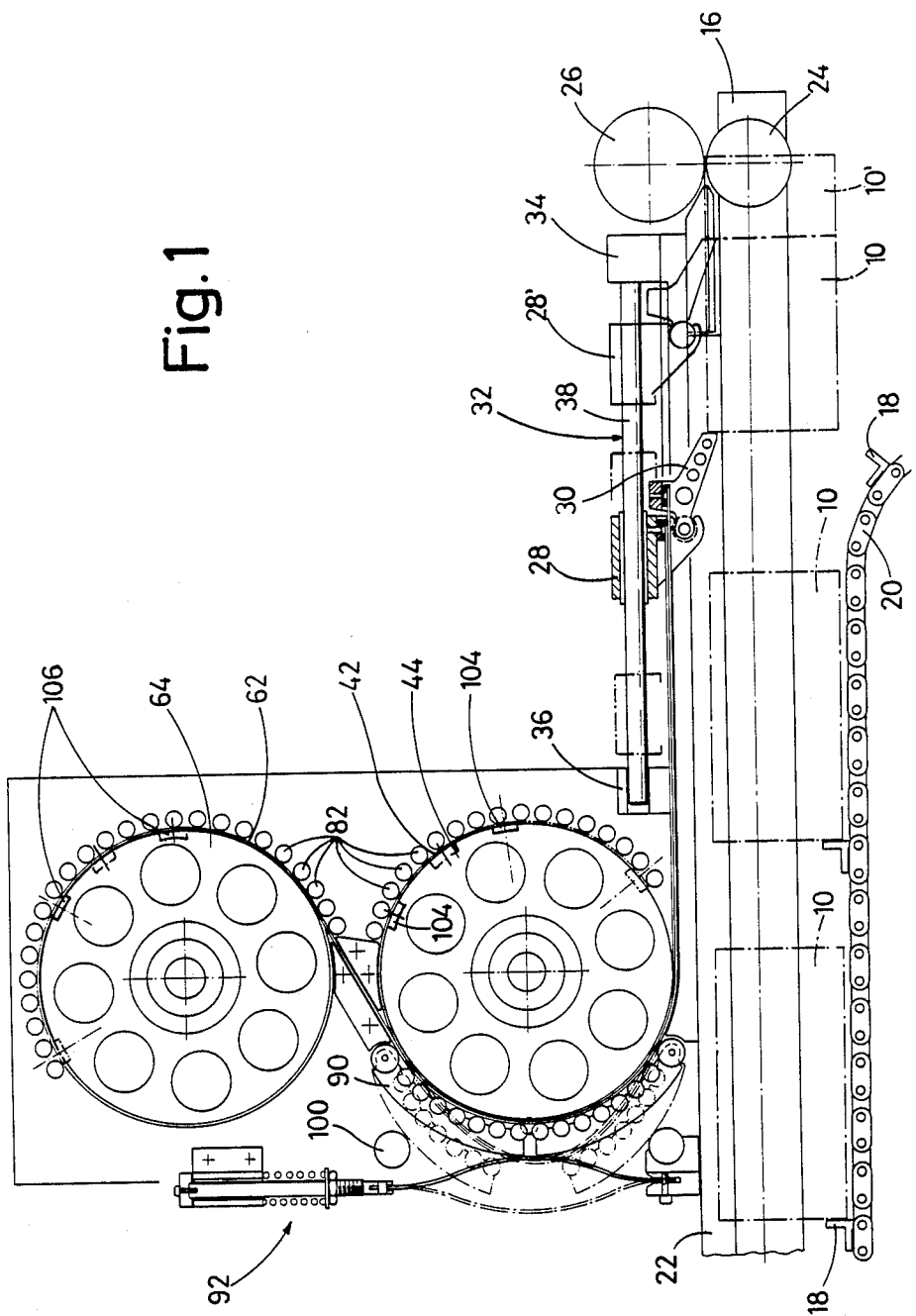
FIG. 1 shows a side view of the device according to the invention.
Figure 3:
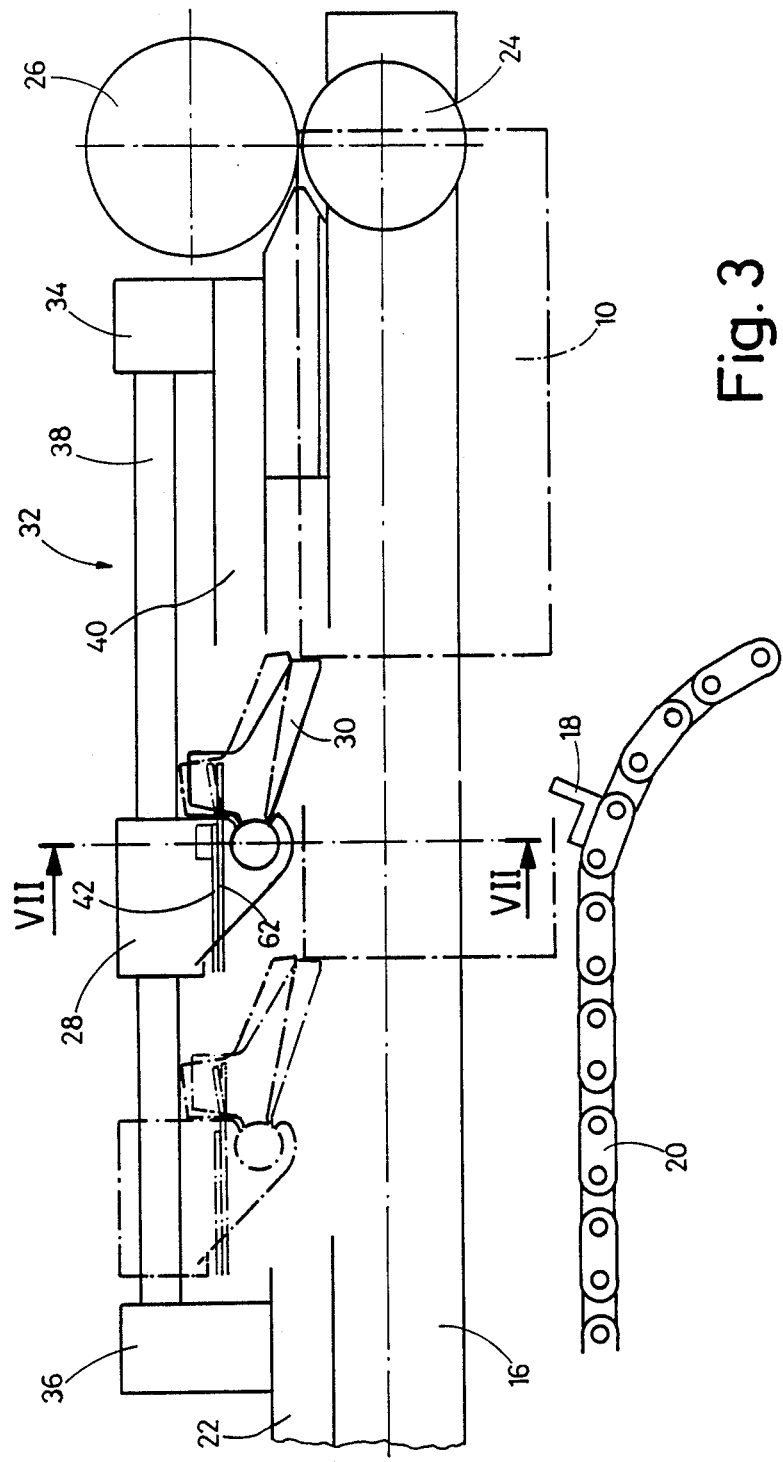
FIG. 3 shows an enlargement of the right-hand half of FIG. 1.
Figure 4:
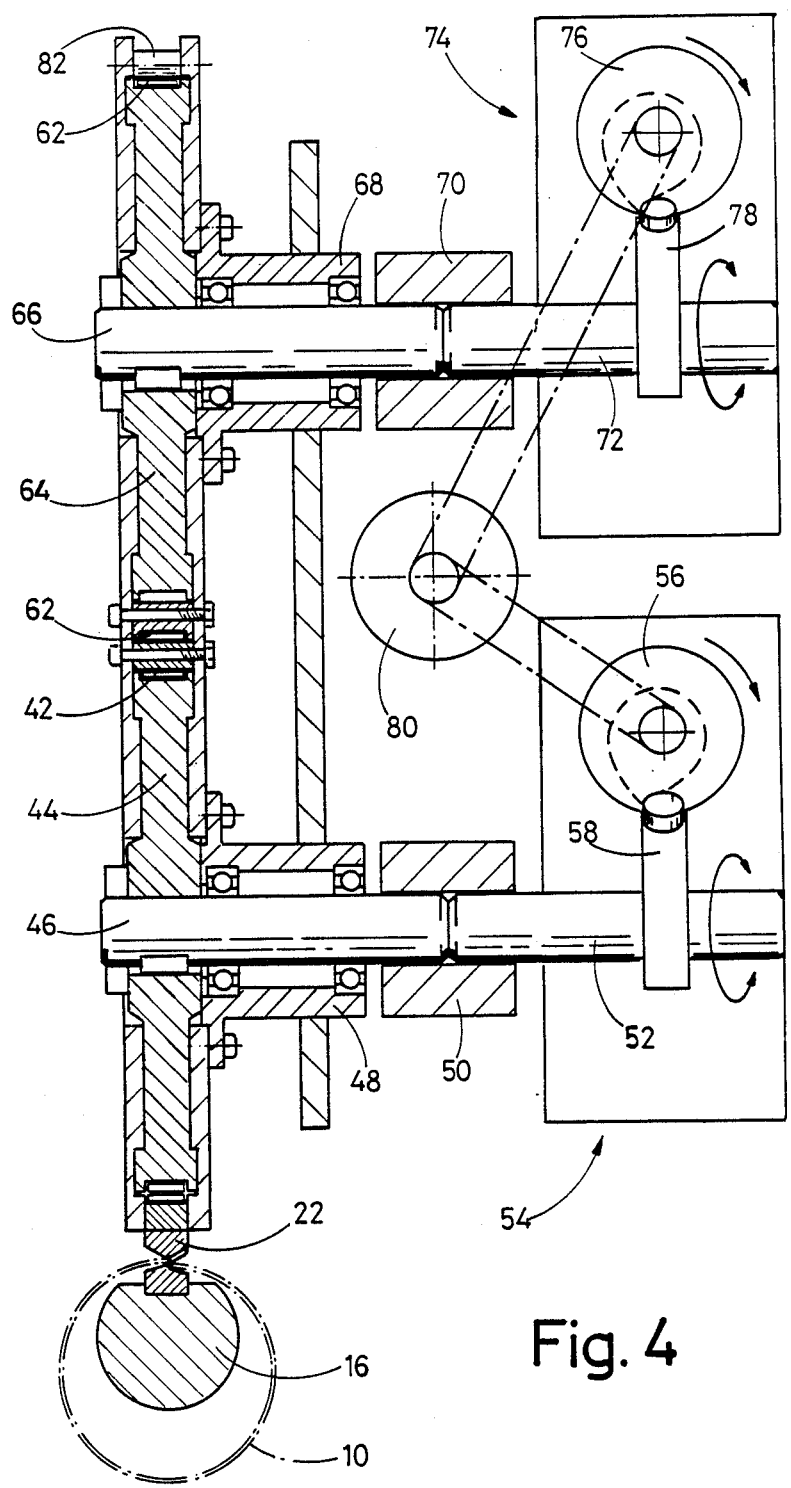
FIG. 4 shows the vertical IV—IV in FIG. 2.
Figure 5:
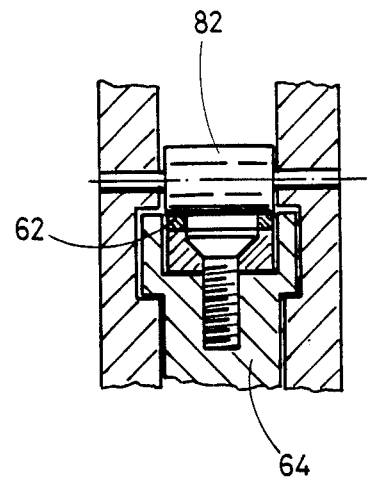
FIG. 5 shows the partial section V—V in FIG. 2.

The purpose of the device according to the invention is to take over the can-body blanks 10 brought up and released, spaced apart, by the conveyor chain 20 and to push them along the front portion, on the right in FIGS. 1 and 3, of the slide rail 22 so far that the longitudinal edges 12 and 14 are caught by the electrode rollers 24 and 26 and welded to one another in an overlapped mash seam.

For this purpose, a pair of conveying catches 30 which engage each can-body blank 10 close to its longitudinal edges 12 and 14, is mounted for pivoting up and down on a catch carrier 28. The catch carrier 28 is reciprocable along a guide 32 which is secured to the front portion of the slide rail 22 and comprises two supports 34 and 36 between which a cylindrical rod 38 extends parallel to the arm 16. The catch carrier 28 is guided on the rod 38 and is seated astride a lower portion of the guide 32 which forms a band guide 40.

For the reciprocating motion of the catch carrier 28, a first flexibly resilient band 42 of spring steel (or fibre-reinforced plastics material, glass fibre, carbon fibre, Keflar) is provided which is secured by one end to the catch carrier and by the other to the circumference of a first circular drive disc or sheave 44. The sheave 44 is secured to a shaft 46 which is mounted in a stationary bearing housing 48 and connected, for rotary adjustment, through a clamp coupling 50, to the drive shaft 52 of an oscillating mechanism 54. The oscillating mechanism 54 is of a known type of construction and has a cam plate 56 with a circular outline which can be driven at a uniform angular velocity and which, during its rotation, imparts backward and forward rotary movements to a swinging member 58 secured to the output drive shaft 52.

For the pivotal mounting of the conveying catches 30 on the catch carrier 28, a pair of aligned trunnions 60 is provided on this, the common geometrical axis of which extends transversely to the longitudinal direction of the arm 16 and of the guide 32. In order to pivot the conveying catches 30 between a lower working position and an upper retracted position, the conveying catches are connected to a second drive disc or sheave 64 with a circular contour by means of a second flexibly resilient band 62 of spring steel (or fibre-reinforced plastics material, glass fibre, carbon fibre, Keflar).

The second band 62 lies directly on the band guide 40 and is wrapped, jointly with the first band 42, round a circumferential portion of the first sheave 44 before it reaches the second sheave 64. The band 62 is wrapped round this in a direction which is opposite to the direction in which it is wrapped round the sheave 44. In this manner, it is possible to keep the gap between the two sheaves 44 and 64 particularly small and to arrange the two sheaves vertically one above the other in a space-saving manner.

The second sheave 64 is secured to a shaft 66 which is mounted in a stationary bearing housing 68 and connected, for rotary adjustment, through a clamp coupling 70, to the output drive shaft 72 of a second oscillating mechanism 74. This second oscillating mechanism 74 also has a cam plate 76 which is rotatable at a uniform angular velocity and a swinging member 78 which can be moved backwards and forwards by this and is secured to the drive shaft 72.

Associated with the two cam plates 76 is a common rotary drive 80; in consequence, the backward and forward rotary movements of the two sheaves 44 and 64, caused by the oscillating mechanisms 54 and 74, are co-ordinated with one another. The cam plates 56 and 76 are, however, so formed and arranged that the rotary movements of the two sheaves 44 and 64 are in phase-displaced relation to one another.

The phase displacement is such that during each working stroke of the catch carrier 28 - movement from left to right in FIGS. 1 and 3 - the conveying catches 30 assume their lower position, the working position, and push a can-body blank 10 along in front of them. At the end of each working stroke, the conveying catches 30 pivot upwards so that during the return stroke of the catch carrier 28 they move back above the last can-body blank 10 pushed forwards, without touching this. Finally, at the end of the return stroke, the conveying catches 30 are pivoted down again into their working position.

Figure 2:
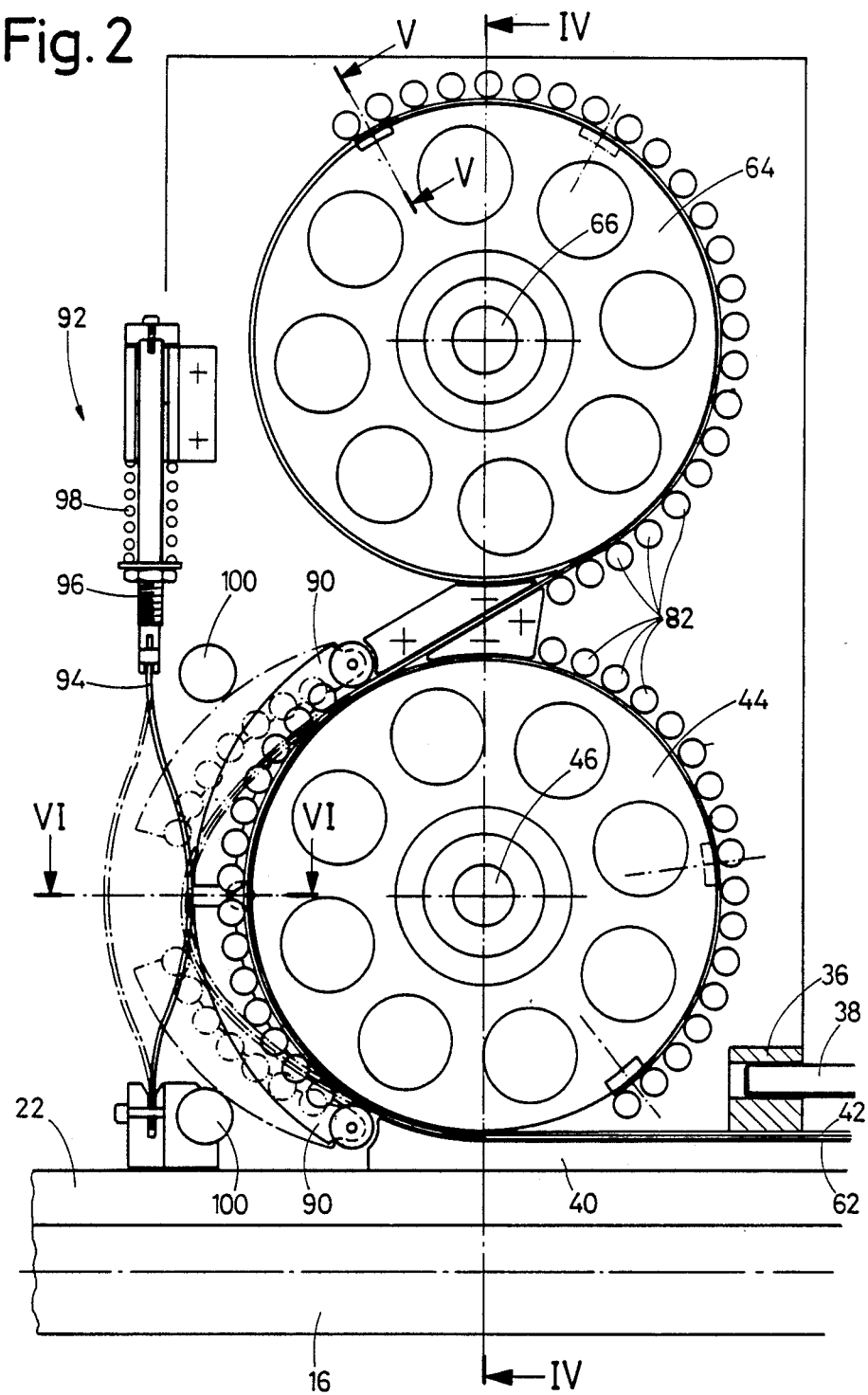
FIG. 2 shows an enlargement of the left-hand half of FIG. 1.
Figure 8:
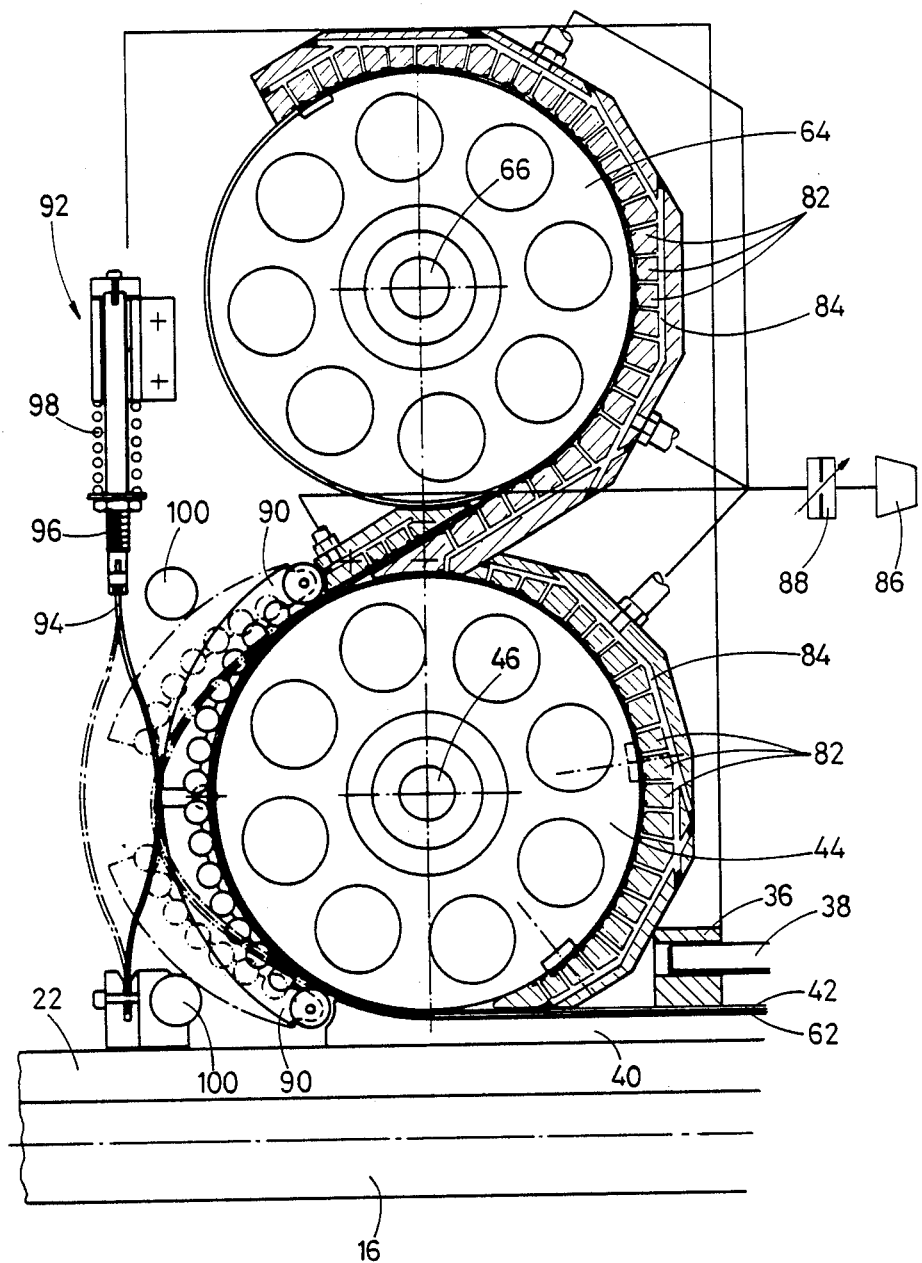
FIG. 8 shows a view, corresponding to FIG. 2, of a modified form of embodiment.

The sheaves 44 and 64 are so arranged that the bands 42 and 62 push the catch carrier 28 or the conveying catches 30 during each working stroke and pull them during the return stroke. Thus the bands 42 and 62 are loaded in compression during each working stroke. In order that the bands 42 and 62 may not be able to yield under loadings which are regarded as permissible, guide members 82 are arranged all round edge regions of the two sheaves 44 and 64 round which the one or the other band or both bands 42 and 62 are wrapped. The guide members 82 may be formed from individual rollers mounted parallel to the axes of the sheaves 44 and 64, as shown in FIGS. 1 and 2, and/or of non-rotatable blocks, between which compressed air, which is supplied from a compressor 86 through a pressure regulator 88, emerges through ducts 84 in order to support the bands 42 and 62 with as much freedom from friction as possible, as shown in FIG. 8.

Both bands 42 and 62 are wrapped round the first sheave 44 in one region of its circumference. The guide members 82 provided in this region are divided into two groups, each of which is disposed on a jaw 90. The two jaws 90 are mounted in such a manner that they can be swung away from one another and from the sheave 42. In FIGS. 1, 2 and 8, the two jaws 90 are illustrated in full lines in their normal operating position and in chain lines in a swung-away position which they assume if at least one of the two bands 42 or 62 is overloaded during a working stroke, for example as a result of the fact that a can-body blank 10 has jammed or a pile-up of a number of can-body blanks has occurred.

The operating position of the two jaws 90 is normally maintained by a bistable spring arrangement 92. This consists essentially of a leaf spring 94 which is fully gripped at one of its ends and is secured, by its other end, to a pin 96 which is loaded in the direction of the leaf spring 94 by a compression 98. In its normal position, which is shown in full lines in FIGS. 1, 2 and 8, the leaf springs 94 has a curvature with which it exerts radial forces on the two jaws 90 in relation to the sheave 44. In the event of overload, the leaf spring 94 snaps over so that it arches away from the sheave 44 and releases the two jaws 90. The pivotal range of the two jaws 90 away from the sheave 44 is limited by stops 100.

Figure 6:
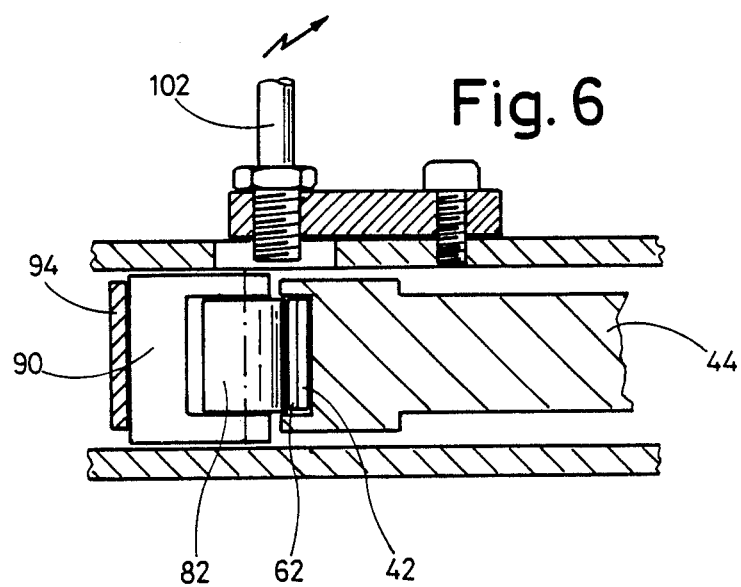
FIG. 6 shows the partial section VI—VI in FIG. 2.

The position of the jaws 90 is monitored by a sensor 102 (FIG. 6). When the jaws 90 swing away from the sheave 44, the sensor 102 delivers a signal which is evaluated by a monitoring circuit of known type and leads to the fact that the rotary drive 80 is immediately switched off.

Instead of the comparatively long can-body blanks 10 indicated in FIG. 1, the device described can convey shorter can-body blanks into the range of action of the electrode rollers 24 and 26. When conveying such a very much shorter can-body blank 10', which is likewise indicated in FIG. 1, the catch carrier comes into the end position designated by 28'. Finally, it is indicated in FIG. 1 that each of the bands 42 and 62 is secured to the associated sheave 44 or 64 by means of a clamping member 104 or 106. During the backward and forward rotary movements of the associated sheave 44 or 64, these clamping members 104 and 106 assume different end positions according to the length of can for which these rotary movements are adjusted.

I claim:

1. A conveyor device workpiece having
   a catch carrier (28, 28') which is reciprocal along a guide (32),
   at least one conveying catch (30) which is pivotably mounted on the catch carrier (28, 28'), and
   a transmission which connects the catch carrier (28, 28') to a rotary drive, characterized in that the transmission comprises at least one sheave (44, 64) having a central axis and being reversibly rotatable in opposite directions about the axis means for reversibly rotating the at least one sheave about said central axis, and at least one flexibly resilient band (42, 62) which is secured by one of its ends to the sheave, it wrapped partially around the sheave to move with the reversible rotations of the sheave and is secured by its other end to the catch carrier of the sheave and is catches whereby the carrier or catches are moved backward and forward on the guide with the reversible sheave rotations.

2. A conveyor device as claimed in claim 1, characterised in that secured to a first sheave (44) which can be rotated backwards and forwards is one end of a first flexibly resilient band (42), the other end of which is secured to the catch carrier (28, 28').
   secured to a second sheave (64) which can be rotated backwards and forward is one end of a second flexibly resilient band (62), the other end of which is secured to the conveying catches (30), and
   the two sheaves (44, 64) can be driven in phase-displaced relation to one another.

3. A conveyor device as claimed in claim 2, characterised in that said means for rotating each of the sheaves (44, 64) is connected to a shaft (52, 72) driving it by means of a clamp coupling (50; 70) which makes possible a continuously variable rotary adjustment of the sheave in relation to the shaft.

4. A conveyor device as claimed in claim 2, characterised in that both bands (42, 62) are wrapped round one of the two sheaves (44) over a portion of its circumference.

5. A conveyor device as claimed in claim 4, characterised in that one of the two bands (62) is wrapped round both sheaves (44, 64) in opposite directions.

6. A conveyor device as claimed in claim 1, characterised in that
   at least part of the circumference of at least one sheave (44) is surrounded by guide members (82) which guide the associated band (42) round the sheave (44) in question, and
   at least one of the guide members (82) can be moved automatically away from the associated sheave (44) in the event of overload.

7. A conveyor device as claimed in claim 6, characterised in that two guide members or groups of guide members (82) are each provided on a jaw (90), and these jaws (90) can be swung away from one another and from the associated sheave (44) in the event of overload.

8. A conveyor device as claimed in claim 7, characterised in that the two jaws (90) are supported by a common, bistable spring arrangement (92).

9. A conveyor device as claimed in claim 6, characterised in that associated with at least one guide member (82) which can be moved away in the event of overload is a sensor (102) which switches off the rotary drive (80) in the event of overload.

10. A conveyor device as claimed in claim 1, on a machine for welding together the longitudinal edges (12, 14) of rounded can-body blanks (10, 10'), which comprises a slide rail (22) on which the longitudinal edges are guided, characterised in that
    a band guide (40) is disposed along at least a portion of the slide rail (22) and
    the catch carrier (28, 28') is mounted astride the band guide (40) and carries a conveying catch (30) at each side thereof.

* * * * *